Figure 1:
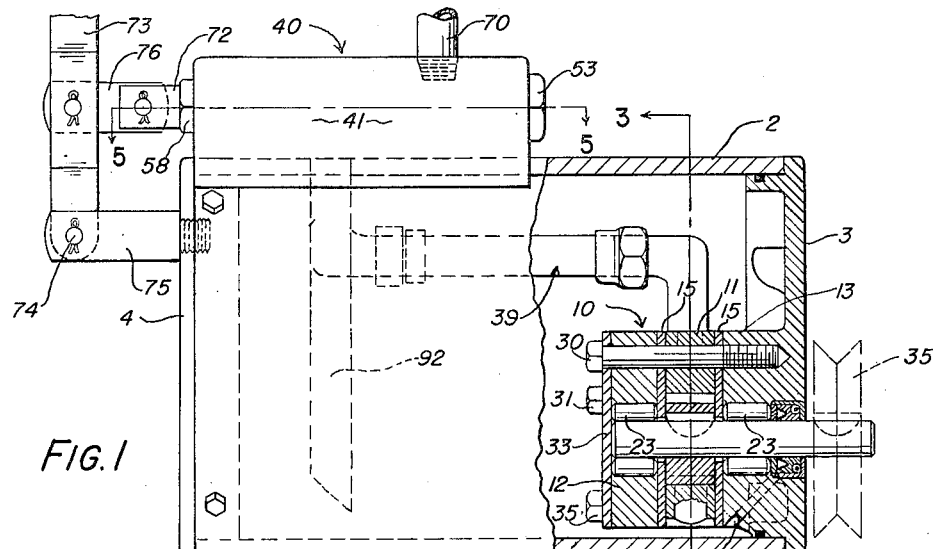

March 27, 1951 D. J. SCHNEIDER 2,546,565
HYDRAULIC UNIT COMPRISING RESERVOIR, PUMP, AND VALVE
Filed Aug. 22, 1946 2 Sheets-Sheet 1

INVENTOR.
DANA J. SCHNEIDER
BY
Hull & West
ATTORNEYS

March 27, 1951     D. J. SCHNEIDER     2,546,565
HYDRAULIC UNIT COMPRISING RESERVOIR, PUMP, AND VALVE
Filed Aug. 22, 1946     2 Sheets-Sheet 2

INVENTOR.
DANA J. SCHNEIDER
BY
Hull + West
ATTORNEYS

Patented Mar. 27, 1951

2,546,565

UNITED STATES PATENT OFFICE 2,546,565

HYDRAULIC UNIT COMPRISING RESERVOIR, PUMP, AND VALVE

Dana J. Schneider, Painesville, Ohio

Application August 22, 1946, Serial No. 692,273

7 Claims. (Cl. 103—42)

This invention consists of improvements in hydraulic units of the kind incorporating a reservoir, pump and valve, and which are used for furnishing power to, and for controlling the action of, hydraulic equipment such, for example, as that employed in agricultural or road working machinery.

As is well known, hydraulic equipment of the sort referred to usually comprises a cylinder and piston, the piston being driven in one direction by the admission of liquid under pressure to an end of the cylinder and then held in any position to which it is moved by shutting off escape of said liquid. The piston is biased by weight of the load or by spring or other means in the direction of its return movement, wherefore the retraction of the piston may be governed by controlling the escape of the liquid from the cylinder.

My improvements have in view simplification of construction and design, reduction in cost of manufacture by minimizing the amount of machine work required and forming the parts in such manner as will facilitate assembly, and maintaining high efficiency and durability in hydraulic units of the kind to which the invention pertains.

Further objects are to provide a unit of the aforesaid character that is compact; wherein the pump is enclosed by the reservoir and submerged in the oil that serves as the pressure medium so that thorough lubrication is assured and so that any leakage that may occur in the pump is of no concern, the escaping liquid merely returning to the reservoir which, as will presently be seen, is under low pressure; wherein the pump may be adapted to either right or left hand drive by convenient interchange of the driving and driven shafts of the pump without affecting the high and low pressure port arrangement; wherein a simple desirably hardened retainer plate for the pump serves as end thrust bearings for said shafts, and to provide a unit of the aforesaid character that is of substantially universal application in the field of hydraulic equipment in which it is intended to be used and wherein the driving and driven shafts may be interchanged, as aforesaid, and also wherein the valve mechanism may be orientated with respect to the reservoir for the purpose of adapting the unit to different circumstances, all without the need of otherwise disassembling the unit.

A further object of the invention is to provide a simple, substantial and durable valve mechanism for units of the aforesaid character, which is designed to facilitate and cheapen manufacture, assembly, and replacement of parts, and which is highly efficient and durable, and is convenient of manipulation for effecting the operation, and controlling the action, of the hydraulic equipment.

Figures 2, 3:
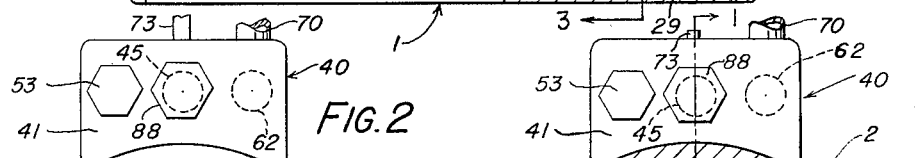
Figure 4:
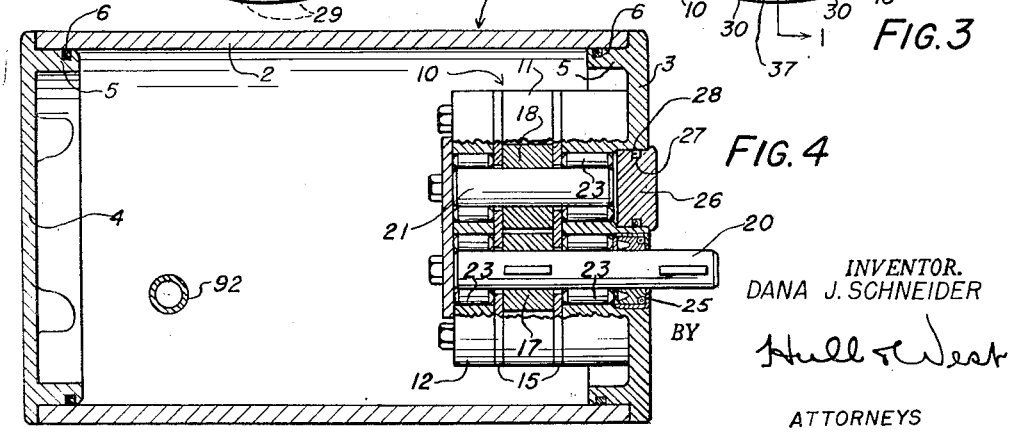
Figure 5:
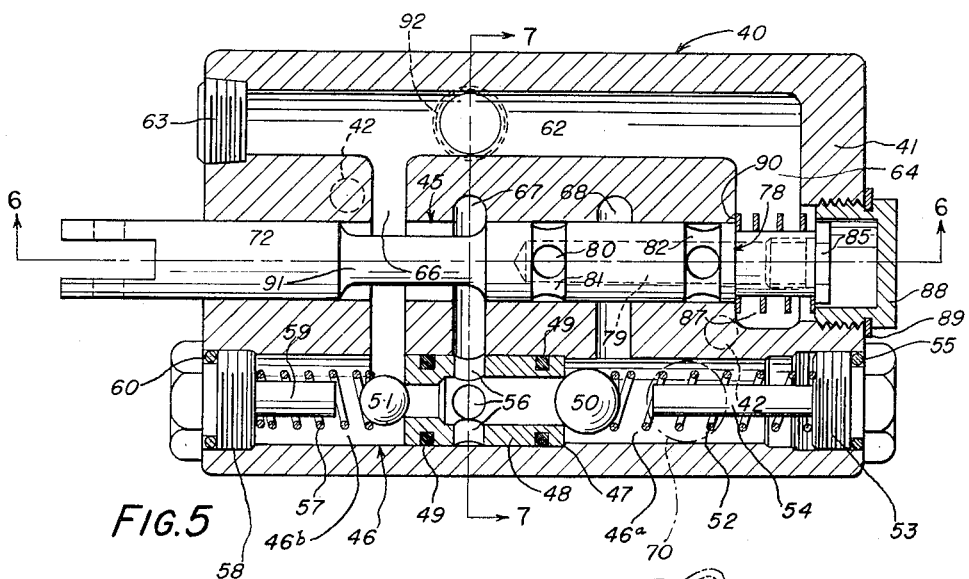
Figure 6:
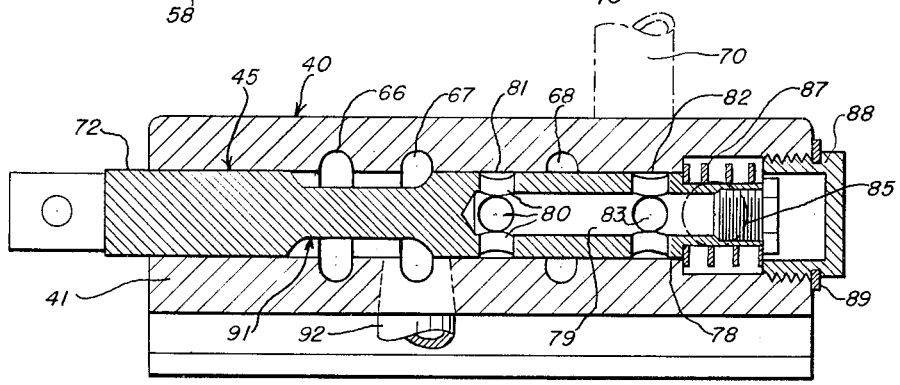
Figure 7:
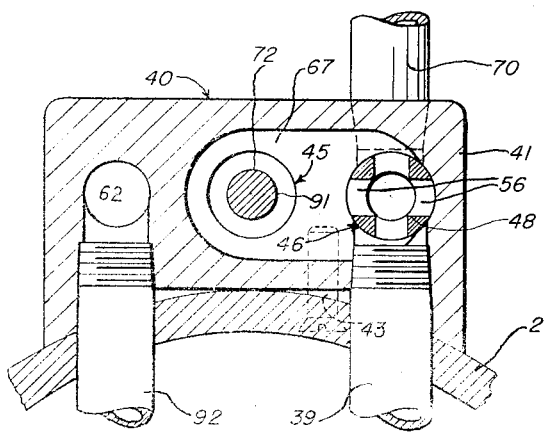

The foregoing objects, with others that will appear as this description proceeds, are attained in the embodiment of the invention illustrated in the accompanying drawings wherein Fig. 1 is a side elevational view, partly in section, of a hydraulic unit constructed in accordance with the invention, the sectional portion of the view being substantially on the line 1—1 of Fig. 3; Fig. 2 is an end elevation of the unit as viewed from the right of Fig. 1; Fig. 3 is a transverse section substantially on the line 3—3 of Fig. 1; Fig. 4 is a horizontal section through the unit, the plane of section being coincident with the axis of the casing excepting where it is dropped down to the central region of the pump, as indicated by the line 4—4 of Fig. 3; Fig. 5 is a sectional plan of the valve mechanism on a scale twice that of the preceding views, the plane of section being indicated by the line 5—5 of Fig. 1, and Figs. 6 and 7 are sections on the respective lines 6—6 and 7—7 of Fig. 5, the latter view including a fragment of the peripheral wall of the reservoir.

Similar reference characters denote similar parts throughout the several views.

The reservoir, designated generally by the reference numeral 1, is made up of a cylindrical wall 2 and end walls 3 and 4. The wall 2 consists of a piece of tubing of suitable length, diameter and wall thickness, and for the sake of lightness, it is preferably made of aluminum. This is also true of other parts of the structure, where aluminum would provide the essential characteristics. The end walls 3 and 4 are desirably cast and machined to accurately fit within the opposite ends of the wall 2, said end walls being shown as provided with peripheral flanges that abut the ends of the wall 2. Both end walls are shown as having circumferential grooves 5, occupied by conventional sealing rings 6. The end walls are held within the ends of the wall 2 by screws 7 that pass freely through radial holes in said wall 2 and are threaded into registering tapped holes in the end walls.

The housing of the pump, designated generally by the reference numeral 10, is made up of a central section 11, an inner section 12, and an outer section 13, the latter preferably being cast integral with the end wall 3. Said sections are separated by wear plates 15. The pump is of the gear type and the central housing section 11 contains the cylindrical pumping chambers 16 that are occupied by the gears 17 and 18. The former is keyed to a driving shaft 20, while the latter is mounted on a driven shaft 21. The wear plates 15 and the housing sections 12 and 13 are provided with apertures for the accommodation of said shafts, those in the wear plates being only slightly greater in diameter than the shafts while those in the housing sections are enough larger to accommodate anti-friction bearings 23, shown as rollers. The forward ends of the apertures in the housing section 13, between the adjacent bearings 23 and where said apertures open through the front wall 3, are shown as enlarged in diameter, and within the one through which the driving shaft 20 extends is fitted an oil seal 25 of conventional form. In the other aperture is pressed a plug 26, having a circumferential groove 27 that is occupied by a sealing ring 28. Oil which may escape from the pumping chambers along the shafts to the forward portions of the apertures in the housing section 13 is drained back into the reservoir through ports 29. As shown in Fig. 4, the driven shaft 21 terminates at its forward end slightly beyond the adjacent bearing 23 and may contact the inner side of the plug 26.

The pump housing sections 11 and 12, with the wear plates 15, are secured to the section 13, that is formed integral with the end wall 3, by means of screws 30 and 31, the former screws passing also through a retainer plate 33. This retainer plate contacts the rear side of the housing section 12, where it serves as end thrust bearings for the shafts 20 and 21, and closes the apertures of said section that contain the adjacent anti-friction bearings 23. In the region of the screws 31, dowel pins 34 occupy aligned holes in the housing sections and wear plates and serve to locate said parts in proper relation to one another. A driving element 35, shown in dot-and-dash lines in Figs. 1 and 2 as a grooved pulley, is suitably fastened to the forward end of the driving shaft 20, as by means of a key. The driving element may, of course, take other forms, such as spur, angle or other type gears, depending upon the circumstances.

The inlet and outlet ports of the pump 10 are designated 37 and 38, respectively, and the latter communicates, through a conduit 39, with the so-called high pressure or inlet port of a valve mechanism 40 which I shall now describe.

Surmounting the reservoir, and shown as located adjacent the end thereof remote from the pump, is the valve mechanism 40 to which reference has just been made, and the casing of which is designated 41. Said casing is fastened to the wall 2 of the reservoir by screws that are extended upwardly through apertures in said wall and are threaded into tapped holes 42 in the casing, indicated in dotted lines in Fig. 5. One of the screws, designated 43, is shown in Fig. 7. The casing has a central longitudinal bore that constitutes a guideway 45, and parallel thereto, a bore 46, said guideway and bore opening through both ends of the casing. The bore 46 is enlarged from what may be regarded as the rear end of the casing to a point somewhat beyond its longitudinal center to provide a shoulder 47, forwardly against which a sleeve 48 is pressed. To insure against leakage about the sleeve, the latter is provided with circumferential grooves that are occupied by sealing rings 49. The front and rear ends of the sleeve 48 provide seats for ball check valves 50 and 51, the latter being shown as smaller than the former and the end of the bore adjacent the smaller valve being correspondingly reduced in diameter. A helical spring 52 is compressed between the ball valve 50 and a screw plug 53 that is threaded into the forward end of the bore 46. Said plug carries a pin 54 that extends axially into the bore and serves as a guide for the spring 52 and a stop for the valve 50. A washer 55 of packing material occupies a groove about the plug 53 adjacent the head thereof, to prevent leakage at this point. As best shown in Fig. 7, the high pressure conduit 39 communicates through an inlet of the casing, with the bore 46 below the sleeve 48 in vertical alignment with radial ports 56 of said sleeve. The sleeve 48 divides the bore 46 into a so-called working chamber 46$^a$ and a relief chamber 46$^b$, wherefore the check valve 51 may be referred to as the relief valve. This valve 51 is urged toward its seat by a helical spring 57 that is compressed between the valve and a screw plug 58 that is threaded into the rear end of the bore 46 and carries a pin 59 that serves as a guide for said spring and a stop for the valve. The plug 58 is equipped with a packing washer 60.

Adjacent the side of the casing remote from the bore 46 is a duct 62 that is closed at its rear end by a screw plug 63. At its forward end said duct communicates, through a lateral branch 64, with the adjacent end of the guideway 45. A transverse passage or port 66 establishes communication between the duct 62, the guideway 45 and the relief chamber 46$^b$. The inlet of the casing and consequently the high pressure conduit 39, as well as the bore of the sleeve 48 (by way of its radial ports 56) communicate with the guideway 45 through a passage or port 67, and the guideway 45 and working chamber 46$^a$ communicate through a passage or port 68. Also communicating through an opening of the casing with the working chamber 46$^a$ is a pipe or conduit 70 that is intended to convey liquid to and return it from the hydraulic equipment that is to be operated and controlled by my invention.

Slidably fitting the guideway 45 is a valve member 72 in the form of a cylindrical plunger, and the same is adapted to be reciprocated by a lever 73. Said lever is pivoted at 74 to a bracket 75 on the rear end of the reservoir, and is connected by a link 76 to the adjacent end of the valve member. Said member is reduced in diameter for a distance forwardly from its rear end to provide a shoulder 78, and it is provided with an axial bore 79 that extends forwardly from said rear end to where it communicates, through radial ports 80, with a circumferential groove 81. A second circumferential groove 82, located intermediate the former groove 81 and the rear end of the valve member, communicates with the bore 79 through radial ports 83. The bore 79 is closed at its rear end by a screw plug 85, the head of which extends radially beyond the reduced end of the plunger to form an abutment between which and the previously mentioned shoulder 78 a spring 87 is confined. This spring is made of flat wire that is relatively wide in a radial direction. The guideway 45 is somewhat enlarged forwardly of the branch 64 of the duct 62, and threaded into the enlargement of the guideway is a cap 88 that carries a washer 89 for sealing the joint between the cap and casing 41. This cap also forms a stop against which one end of the spring 87 is adapted to bear, while a stop for the opposite end of the spring is provided by a shoulder 90, constituted of a portion of the wall of the branch duct 64 where it surrounds the guideway 45.

The valve member 72 is normally held in neutral position (in which position it is illustrated in the drawings) by the spring 87, under which circumstances one end of said spring engages the forward end of the cap 88 and the head of the plug 85, while its opposite end engages the shoulders 78 and 90. The valve member 72 is reduced in diameter for a distance somewhat greater than the spacing apart of the ports 66 and 67, and the space thus provided will be referred to for descriptive purposes as the "relief" 91. It may also be explained that the circumferential grooves 81 and 82 of the valve member are spaced apart the same distance as the ports 67 and 68. When the valve member is in neutral position the relief 91 overlaps both ports 66 and 67, with the front end wall of the relief substantially flush with the corresponding side wall of the port 67.

Communicating with the duct 62 through an outlet opening of the casing that is in transverse alignment with the inlet opening thereof to which the high pressure conduit 39 is connected, is a low pressure or return conduit 92 that extends through a hole in the wall 2 and terminates at its lower end adjacent the bottom of the reservoir, as best shown in Fig. 1.

For the purpose of describing the operation of the invention, it will be assumed that my improved unit is installed in apparatus equipped with a hydraulic actuator for some working part of the apparatus; that said actuator consists of a cylinder and piston; that the pipe 70 leads to the inlet of such cylinder; and that the driving shaft 20 of the pump 10 is operatively connected to a source of power through suitable transmission means involving the driving element 35, which source of power may be an internal combustion engine that forms a part of the aforesaid apparatus. The unit that constitutes my invention may be variously supported, as by a bracket attached to either of the ends walls or by one or more bands surrounding the cylindrical wall of the casing, such expedients being obvious to those acquainted with the class of equipment to which the invention pertains.

With the system supplied with oil or other suitable liquid in sufficient amount to practically fill the reservoir 1 and the ports and passages of the valve mechanism and the pipe 70 to the hydraulic cylinder or other equipment that is to be actuated by the pump, the pump is set in operation. With the valve member 72 held by the spring 87 in neutral position, as illustrated, liquid will be drawn from the reservoir and impelled by the pump through the conduit 39 to the bore 46 and thence through the port 67, relief 91, port 66, duct 62 and pipe 92, back to the reservoir. Circulation of the liquid through this course continues as long as the valve member remains in neutral position, under which circumstances, the liquid in the sleeve 48 is under negligible pressure.

Now, when it is desired to operate the hydraulic equipment to which the unit is connected through the pipe 70, the lever 73 is swung rearwardly to move the valve member 72 in a corresponding direction far enough to shut off communication between the guideway 45 and the port 67. Under such an adjustment of the valve member 72, the liquid from the pump is diverted inwardly through the radial ports 56 of the sleeve 48 to the interior of said sleeve and, unseating the valve 50 against the action of the spring 52, continues through the working chamber 46$^a$ and pipe 70 to the hydraulic equipment (not shown, but which, for our purpose, as previously stated, may consist of a cylinder and piston; and it is understood that the piston is advanced by the liquid in opposition to some load that tends to retract the piston).

It should here be explained that the spring 52 is of considerably less power than the spring 57, wherefore the valve 50 will open at a much lower pressure than the relief valve 51, and the differential in resistance to opening of the two valves is further promoted by the reduced area of the relief valve 51 that is exposed to the liquid pressure. The power or tension of the spring 57 is such as will retain the relief valve 51 closed under normal working conditions, or until a predetermined high pressure is built up in the sleeve 48 and working chamber 46$^a$ and the conduit 70. When such high pressure is attained, the valve 51 is unseated to permit escape of the liquid through the relief chamber 46$^b$, port 66, duct 62 and pipe 92 back to the reservoir. Such a condition may occur when excessive load is imposed upon the hydraulic equipment, or when the piston of such equipment reaches the limit of its working stroke.

The hydraulic equipment may be stopped and held at any position within its range of movement by releasing the lever 73 and allowing the spring 87 to return the valve member 72 to neutral position. Under these conditions the check valve 50 closes and traps the liquid within the part of the system that is now in communication with the hydraulic equipment. When it is desired to permit the hydraulic equipment to resume normal condition, as by retraction of a piston, the lever 73 is swung in a direction to move the plunger 72 forwardly in opposition to the spring 87, said spring now bearing at its forward end against the stop provided by the cap 88 and being engaged at its rear end by the advancing shoulder 78 of the valve member 72. Movement is continued until the groove 81 registers with the port 68 and groove 82 reposes within the area of the lateral branch 64 of the duct 62. Now, the liquid is permitted to return through the pipe 70, working chamber 46$^a$, port 68, bore 79 of the valve member, and the branch 64 and duct 62 to the pipe 92 that returns the liquid to the lower portion of the reservoir. The speed at which the hydraulic equipment is permitted to resume normal condition may be governed by throttling the return flow, and this is accomplished by varying the overlapping relation of the groove 81 and port 68.

The present arrangement of the driving and driven shafts 20 and 21 provides for a right hand drive, so to speak—that is, a drive by which the shaft 20 is rotated in a right hand direction when the unit is viewed from the front, as in Fig. 2. It sometimes happens that the power delivery element of the engine or other apparatus by which the pump is to be driven rotates in such a direction that, with the shaft arrangement just mentioned, the pump would be driven in the wrong direction. This situation may be conveniently met by withdrawing the driving shaft 20 and oil seal 25 from the pump housing through the front wall of the reservoir, and removing the plug 26 and withdrawing shaft 21, and interchanging them. To permit this interchange of shafts the front wear plate 15 is notched adjacent to the apertures through which the shafts extend to permit passage of the key that locks the gear thereto, it being understood that both gears 17 and 18 are provided with keyways.

Having thus described my invention, what I claim is:

1. A unit of the class described comprising a reservoir, a pump enclosed by the reservoir and having its inlet open to the liquid space thereof below the minimum operative liquid level in the reservoir, a valve casing surmounting the reservoir and adapted to occupy different orientated positions thereon, the valve casing and the wall of the reservoir whereon it is mounted having each a plurality of apertures that register when the valve casing occupies different orientated positions, a high pressure conduit leading from the outlet of the pump through an aperture of said wall and communicating with the interior of the valve casing through one of the apertures of the latter, a low pressure conduit communicating with the interior of the casing through another of the aforesaid apertures thereof and extending through an aperture in said wall to the interior of the reservoir, a pipe leading from the valve casing and adapted to convey liquid to and from hydraulic equipment, a check valve within the casing subjected to the pressure communicated to the interior of the casing through said high pressure conduit and which check valve opens in response to said pressure, and valve means in the casing shiftable from a first or neutral position wherein it permits communication between the high pressure and low pressure conduits, to a second position wherein it shuts off such communication thereby to cause the liquid from the high pressure conduit to flow past the check valve to said pipe, and to a third position wherein it establishes communication between said pipe and the low pressure conduit, and an operating element for shifting said valve means.

2. Valve mechanism comprising a casing enclosing a working chamber, a relief chamber, a bore connecting said chambers, and a lateral passage intermediate the ends of said bore, the casing having an inlet communicating with said passage, and provided, also, with an outlet, and with an opening communicating with the working chamber, said opening being adapted to have communicative connection with hydraulic equipment, check valves for closing the opposite ends of said bore, springs for seating said valves, the spring for seating the valve in the relief chamber being of considerably greater power than the one for seating the other check valve, the casing having a guideway, a valve member slidable in said guideway, said member and the casing having ports adapted to be selectively brought into register by moving the valve member from a first or neutral position wherein the relief chamber and lateral passage of the bore communicate with the outlet of the casing, to a second position wherein only the inlet communicates with said lateral passage, and to a third position wherein only the working chamber communicates with the outlet of the casing, and means for moving the valve member.

3. Valve mechanism comprising a casing having a bore, a sleeve fitted into the bore intermediate the ends thereof separating the bore into a working chamber and a relief chamber, the sleeve having a lateral passage intermediate its ends and the casing having an inlet communicating with said passage, the casing being provided, also, with an outlet and with an opening communicating with the working chamber, said opening being adapted to have communicative connection with hydraulic equipment, check valves for closing the opposite ends of the sleeve, springs for seating said valves, the spring for seating the valve in the relief chamber being of considerably greater power than the one for seating the other valve, the casing having a guideway, a valve member slidable in said guideway, said member and the casing having ports adapted to be selectively brought into register by moving the valve member from a first or neutral position wherein the relief chamber and lateral passage of the sleeve communicate with the outlet of the casing, to a second position wherein only the inlet communicates with said lateral passage, and to a third position wherein only the working chamber communicates with the outlet of the casing, and means for moving the valve member.

4. Valve mechanism according to claim 3, wherein the bore is of variable diameter to provide a shoulder intermediate its ends against which one end of said sleeve is engaged thereby to position the sleeve within the bore with its lateral passage in communication with the inlet of the casing.

5. Valve mechanism according to claim 3, wherein said bore extends entirely through the casing, a plug closing each end of the bore, a pin projecting inwardly from each plug axially of the bore, said springs being of the helical type and guided upon the pins of the plugs, the pins constituting stops for the check valves.

6. Valve mechanism according to claim 3, wherein the internal diameter of said sleeve is less at the end adjacent the relief chamber, and said check valves are in the form of balls, the one in the relief chamber being of lesser diameter than the one in the working chamber.

7. Valve mechanism comprising a casing having a guideway extending therethrough, a valve member slidably fitting said guideway, the casing enclosing a working chamber and a relief chamber and a bore through which said chambers communicate, a check valve for closing each end of the bore, the casing being provided with an inlet that communicates with said bore and having a port that establishes communication between said inlet and the guideway, the casing also including ports through which the working chamber communicates with said guideway and the relief chamber communicates with the outlet of the casing, the valve member being cut away and ported at intervals intermediate its ends whereby when shifted from a first or neutral position, wherein the relief chamber and aforesaid bore are caused to communicate with the outlet of the casing, to a second position, it will cause the inlet to communicate with said bore, and to a third position it will establish communication between the working chamber and the outlet of the casing, and means for sliding the valve member, the casing having an opening communicating with the working chamber and adapted to have communicative connection with hydraulic equipment.

DANA J. SCHNEIDER.

(References on following page)

REFERENCES CITED

The following references are of record in the file of this patent:

UNITED STATES PATENTS

| Number | Name | Date |
|---|---|---|
| 1,233,069 | Leonard | July 10, 1917 |
| 1,409,868 | Kien | Mar. 14, 1922 |
| 1,592,025 | Jennings | July 13, 1926 |
| 1,716,105 | Braudt | June 4, 1929 |
| 1,913,633 | Heil et al. | June 13, 1933 |
| 1,930,293 | Valentine | Oct. 10, 1933 |
| 2,040,754 | McLeod | May 12, 1936 |
| 2,106,488 | McCune | Jan. 25, 1938 |
| 2,145,404 | Osborne | Jan. 31, 1939 |
| 2,161,729 | Thompson | June 6, 1939 |
| 2,167,879 | DesRoches | Aug. 1, 1939 |
| 2,295,948 | Henry | Sept. 15, 1942 |
| 2,362,945 | Stephens | Nov. 14, 1944 |